United States Patent
Chmiel et al.

(10) Patent No.: US 9,872,297 B2
(45) Date of Patent: Jan. 16, 2018

(54) POWER CONTROL

(75) Inventors: Mieszko Chmiel, Wroclaw (PL); Gunter Wolff, Laupheim (DE)

(73) Assignee: Nokia Solutions and Networks Oy, Espoo (FI)

( * ) Notice: Subject to any disclaimer, the term of this patent is extended or adjusted under 35 U.S.C. 154(b) by 65 days.

(21) Appl. No.: 14/426,798

(22) PCT Filed: Sep. 10, 2012

(86) PCT No.: PCT/EP2012/067616
§ 371 (c)(1),
(2), (4) Date: Jun. 1, 2015

(87) PCT Pub. No.: WO2014/037056
PCT Pub. Date: Mar. 13, 2014

(65) Prior Publication Data
US 2015/0305043 A1 Oct. 22, 2015

(51) Int. Cl.
*H04W 52/36* (2009.01)
*H04W 72/04* (2009.01)
*H04L 5/00* (2006.01)
*H04W 52/34* (2009.01)

(52) U.S. Cl.
CPC ..... *H04W 72/0473* (2013.01); *H04W 52/346* (2013.01); *H04W 52/36* (2013.01); *H04W 72/042* (2013.01); *H04L 5/001* (2013.01)

(58) Field of Classification Search
None
See application file for complete search history.

(56) References Cited

U.S. PATENT DOCUMENTS

| | | | |
|---|---|---|---|
| 8,462,724 B1* | 6/2013 | Immonen | H04W 4/00 370/282 |
| 2010/0202392 A1* | 8/2010 | Zhang | H04W 52/34 370/329 |
| 2010/0202394 A1* | 8/2010 | Zhang | H04W 52/34 370/329 |

(Continued)

FOREIGN PATENT DOCUMENTS

CN 102056307 A 5/2011

OTHER PUBLICATIONS

3GPP TS 36.213 V10.6.0 (Jun. 2012) "3rd Generation Partnership Project; Technical Specification Group Radio Access Network; Evolved Universal Terrestrial Radio Access (E-UTRA); Physical layer procedures (Release 10)"; pp. 1-125; 3rd Generation Partnership Project (3GPP); Mobile Competence Centre; 650, Route des Lucioles; F-06921 Sophia-Antipolis Cedex; France.

(Continued)

*Primary Examiner* — Ayaz Sheikh
*Assistant Examiner* — Tarell Hampton
(74) *Attorney, Agent, or Firm* — Harrington & Smith (57) ABSTRACT

There is provided a method, including detecting, by a network node of a first cell, whether or not there is any output power unused in a second cell during a predefined time period, wherein the un-used output power is originally reserved for a transmission on a specific channel in the second cell; upon detecting that there is at least some of the output power unused, determining the amount of the unused output power in the second cell; and applying at least part of the unused output power to boost a predetermined transmission in the first cell.

22 Claims, 5 Drawing Sheets

(56) References Cited

U.S. PATENT DOCUMENTS

| | | | |
|---|---|---|---|
| 2011/0275403 A1* | 11/2011 | Chen .................. | H04W 52/146 455/522 |
| 2012/0021787 A1* | 1/2012 | Abgrall ............... | H04B 1/7103 455/501 |
| 2012/0196611 A1* | 8/2012 | Venkatraman ...... | H04W 52/143 455/450 |
| 2013/0176953 A1* | 7/2013 | Stern-Berkowitz . | H04W 52/146 370/329 |
| 2014/0233445 A1* | 8/2014 | Yang ................... | H04W 52/38 370/311 |

OTHER PUBLICATIONS

3GPP TSG RAN WG1 Meeting #58bis, Miyazaki, Japan, Oct. 12-16, 2009, R1-093882, "Multi-carrier UL power control for LTE-A.", ASUSTeK, 3 pgs.

3GPP TSG RAN WG1 #59, Jeju, Korea, Nov. 9-13, 2009, R1-094761, "PDCCH Carrier Indication Field for Cross-Carrier Scheduling", Texas Instruments, 4 pgs.

3GPP TSG-RAN WG2 #67, Aug. 24-28, 2009, Shenzhen, P.R. China, R2-094454, "Implementation and Network Operation of E-TFC Selection Algorithm for DC-HSUPA", Qualcomm Europe, 6 pgs.

\* cited by examiner

POWER CONTROL

FIELD

The invention relates generally to mobile communication networks. More particularly, the invention relates to power control between cells.

BACKGROUND

To achieve the high data rate requirement of the Long Term Evolution Advanced (LTE-A) of the 3$^{rd}$ Generation Partnership Project (3GPP), it may be beneficial to increase the transmission bandwidths over those that can be supported by a single carrier. Therefore, a carrier aggregation (CA) is proposed. By using the CA, it may be possible to utilize more than one carrier and in this way increase the overall transmission bandwidth. In carrier aggregation, it is important to reliably schedule the to-be-applied carriers.

BRIEF DESCRIPTION OF THE INVENTION

According to an aspect of the invention, there is provided a method as specified in claim 1.

According to an aspect of the invention, there are provided apparatuses as specified in claims 11 and 21.

According to an aspect of the invention, there is provided a computer program product as specified in claim 22.

According to an aspect of the invention, there is provided a computer-readable distribution medium carrying the above-mentioned computer program product.

According to an aspect of the invention, there is provided an apparatus comprising processing means configured to cause the apparatus to perform any of the embodiments as described in the appended claims.

According to an aspect of the invention, there is provided an apparatus comprising a processing system configured to cause the apparatus to perform any of the embodiments as described in the appended claims.

According to an aspect of the invention, there is provided an apparatus comprising means for performing any of the embodiments as described in the appended claims.

Embodiments of the invention are defined in the dependent claims.

LIST OF DRAWINGS

In the following, the invention will be described in greater detail with reference to the embodiments and the accompanying drawings, in which.

DESCRIPTION OF EMBODIMENTS

The following embodiments are exemplary. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Figure 1:
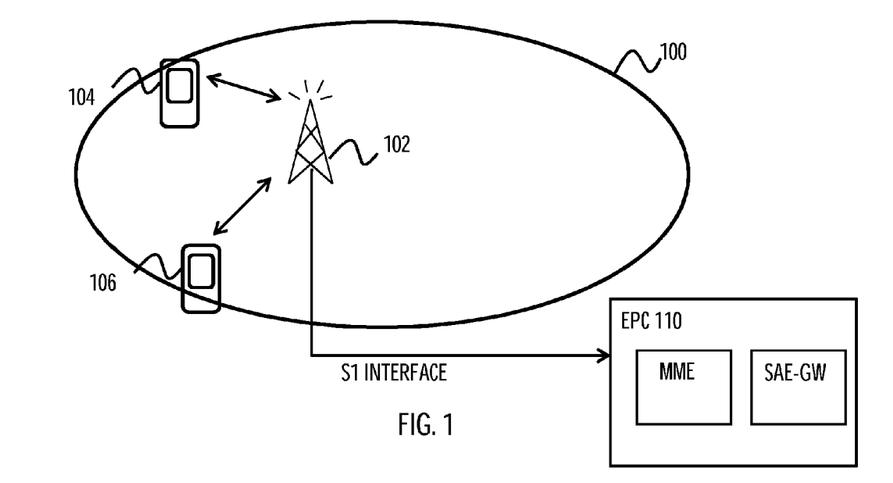
FIG. 1 presents a network.

FIG. 1 shows an example communication network where the embodiments of the invention are applicable to. The communication network of FIG. 1 may comprise a base station 102 providing radio coverage to a cell 100 shown with solid circle and handling radio resource allocation for the cell 100. In general, the base station 102 applicable to the embodiments may be configured to provide communication services according to at least one of the following radio access technologies (RATs): Worldwide Interoperability for Microwave Access (WiMAX), Global System for Mobile communications (GSM, 2G), GSM EDGE radio access Network (GERAN), General Packet Radio Service (GRPS), Universal Mobile Telecommunication System (UMTS, 3G) based on basic wideband-code division multiple access (W-CDMA), high-speed packet access (HSPA), LTE, and/or LTE-A. The present embodiments are not, however, limited to these protocols.

The base station 102 may be node B (NB) as in the LTE, evolved node B (eNB) as in the LTE-A, a radio network controller (RNC) as in the UMTS, a base station controller (BSC) as in the GSM/GERAN, or any other apparatus capable of controlling radio communication and managing radio resources within the cell. For the sake of simplicity, let us assume that the base station 102 is an eNB. In the case of multiple eNBs in the communication network, the eNBs may be connected to each other with an X2 interface as specified in the LTE. The eNB 102 may be further connected via an S1 interface to an evolved packet core (EPC) 110, more specifically to a mobility management entity (MME) and to a system architecture evolution gateway (SAE-GW). The MME is a control plane for controlling functions of non-access stratum signaling, roaming, authentication, tracking area list management, etc., whereas the SAE-GW handles user plane functions including packet routing and forwarding, E-UTRAN idle mode packet buffering, a connection to Internet, etc.

Figure 2A:
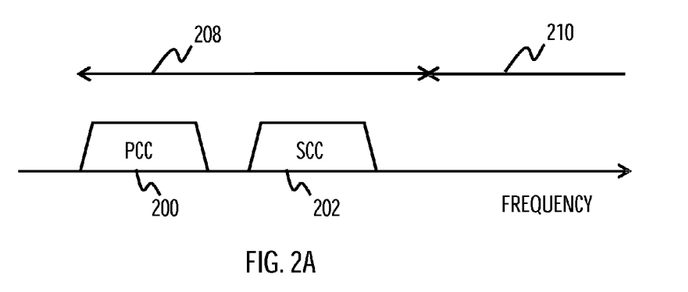
FIGS. 2A and 2B show example carried aggregation scenario.
Figure 2B:
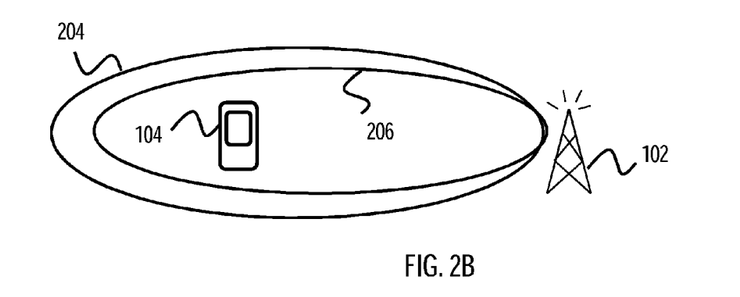

According to an embodiment, the eNB 102 may establish a connection with a user equipment (UE) 104, 106 such as a mobile user terminal, a palm computer, or any other apparatus capable of operating in a mobile communication network. That is, the UE 104, 106 may perform data communication with the eNB 102. There may be situations when the available bandwidth offered by a single carrier is not sufficient. For handling such situations, carrier aggregation (CA) may be applied as one option. Carrier aggregation allows increasing the transmission/reception bandwidth by aggregating cells (a.k.a. component carriers). The prominent benefits of carrier aggregation may include increased peak data rates, the possibility to aggregate fragmented spectrum and fast load balancing. When carrier aggregation is used there are a number of serving cells, one for each component carrier. There are two types of component carriers as shown in FIGS. 2A and 2B:

A primary component carrier (PCC) 200 serving a primary cell (Pcell) 204: This may be the main carrier in any group. There may be a primary downlink (DL) carrier and an associated uplink (UL) primary component carrier. The association between the downlink primary carrier and the corresponding uplink primary component carrier may be cell-specific A secondary component carrier (SCC) 202 serving a secondary cell (Scell) 206: There may be one or more secondary component carriers. The number of SCCs may change dynamically according to prevailing needs.

The carriers 200 and 202 may be within one frequency band 208, which is referred to as an intra-band CA, either adjacent to each other or separated. Alternatively the carriers 200 and 202 may be in different frequency bands 208 and 210, for example, which is referred to as an inter-band CA. The RRC connection is typically only handled by the primary cell, which is served by the downlink and uplink PCC. For FIG. 2B it may be seen that the same eNB 102 may provide coverage to both of the cells 204 and 206. The coverage of the serving cells 204 and 206 may differ, both due to component carrier frequencies but also due to power planning. It should be noted that PCell/SCell are UE specific terms: one cell can be the Pcell for one UE and the Scell for another UE.

As said, the CA requires scheduling or configuration of carriers. Such scheduling information may indicate the component carrier elements or resource elements which are used for data carrying. The scheduling information may also indicate uplink grants for some resource elements. Regarding scheduling there are two main alternatives, either resources are scheduled on a per-carrier basis, i.e. they are valid for the component carrier on which they were transmitted, or a so called cross component scheduling may be used. These are shown in FIGS. 3A and 3B.

Figure 3A:
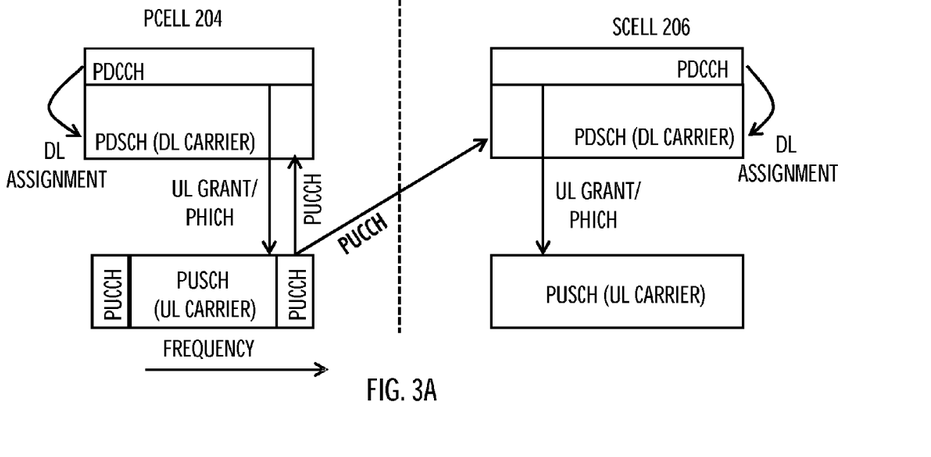
FIGS. 3A and 3B show different scheduling scenarios applicable for the carrier aggregation.

FIG. 3A depicts the former option for the scheduling in which the physical downlink control channel (PDCCH) and the corresponding physical DL data channel (PDSCH) are sent on each cell (Pcell 204 and Scell 206). The corresponding physical UL data channel (PUSCH) may be sent on a system information block (SIB) 2 linked cell. It should be noted that, for the uplink, an association is created between one downlink component carrier and an uplink component carrier. In this way, when uplink grants are sent, the terminal or UE may obtain knowledge on which uplink component carrier to apply. As can be seen, both of the cells (Pcell 204 and Scell 206) convey the PDCCH carrying, for example, uplink grants or downlink assignments to the UE. I.e. each cell 204, 206 may obtain scheduling info from the corresponding DL carrier of the same cell 204, 206, respectively. In the uplink, the physical uplink control channel (PUCCH) may be send from the primary cell 204 corresponding to both cells 204 and 206. Also a physical hybrid-ARQ indicator channel (PHICH) may be sent, as shown.

Figure 3B:
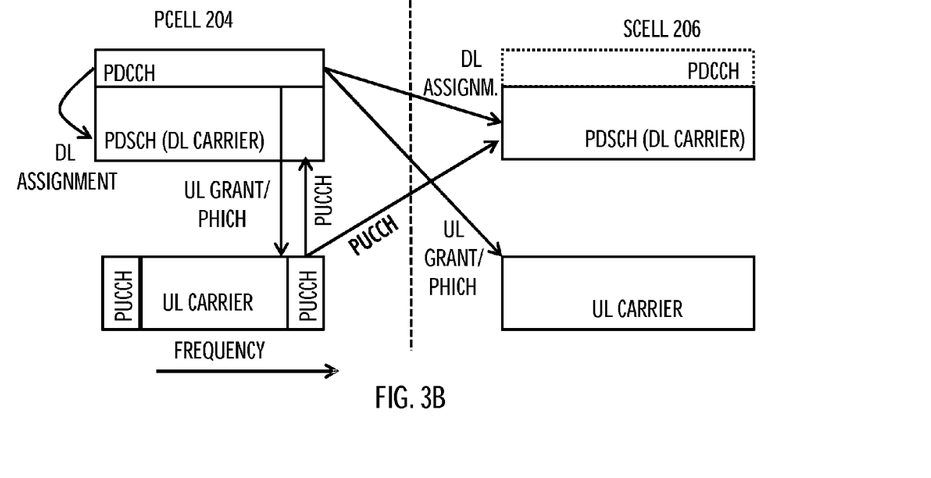

FIG. 3B, on the other hand, represents the latter scheduling option, namely the cross component carrier scheduling (cross CC scheduling), in which the PDCCH and the corresponding PDSCH may be sent on different cells 204 and 206. In other words, the PDCCH of the Pcell 204 may be used to schedule also the secondary cell(s) 206 via the cross CC scheduling (i.e. via the cross scheduling). The scheduling may comprise DL assignments and UL grants/PHICH. The Scell 206 need not necessarily then transmit the PDCCH as shown with the dashed box. It should be noted that in the embodiment of FIG. 3B, the PDCCH may contain an additional carrier indicator field (CIF). The CIF in the PDCCH provides information about the component carrier to be used by the UE for the PDSCH or PUSCH.

Let us from now on, for the sake of simplicity, denote the Pcell also as the cross CC scheduling cell and the Scell also as the cross CC scheduled cell. Some example advantages of the cross CC scheduling may include overhead reduction for virtual extension carriers (e.g. the PDCCH and other control channels might be not transmitted in cross-CC scheduled cell), control channel coverage improvement (e.g. a cell with better coverage may schedule data in the other cells, and CA based intercell interference coordination (ICIC) with co-channel deployment of macro and pico/home eNBs (e.g. a frequency domain coordination of the control channel may be achieved).

However, the use of the cross scheduling is still not optimized in view of the power control. For example, in the case of cross CC scheduling, the control channel of one cell may need to serve the users on more than one cell. This may cause problems such as increased control channel blocking (compared to single cell operation) and/or increased control channel overhead (compared to single cell operation). Furthermore, the PDCCH used for cross CC scheduling includes an additional payload of certain amount bits (i.e. the CIF), which may consequently require a higher signal to interference-plus-noise ratio (SINR) or increased power to achieve a target block error rate (BLER), for example. Known methods for tackling at least some of the above mentioned problems, such as an extension or sharing of a search space for the PDCCH candidate position, do not solve the problems sufficiently.

Figure 4:
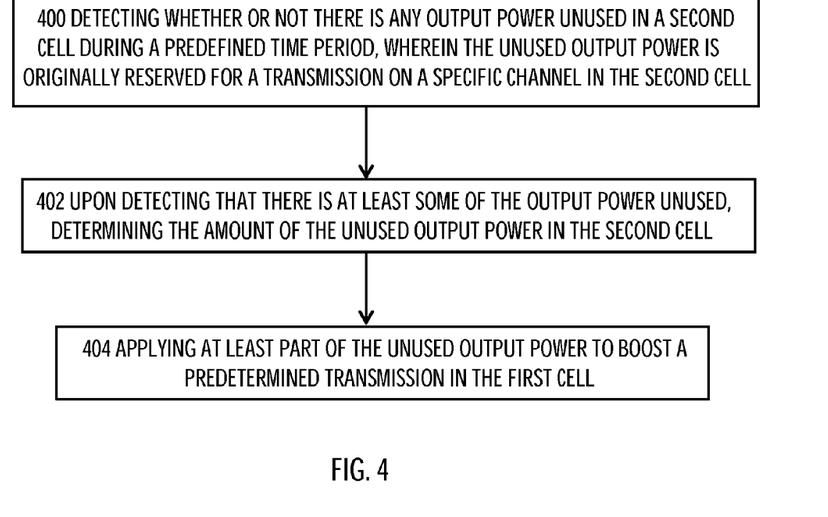
FIG. 4 illustrates a method according to an embodiment.

Therefore, it is proposed, as shown in FIG. 4 to detect in step 400, by a network node of the first cell, whether or not there is any output power unused in the second cell during a predefined time period, wherein the unused output power is originally reserved for a transmission on a specific channel in the second cell. The network node of the first cell may be a base station, radio network controller (RNC), an eNB, etc. For the sake of simplicity, let us assume that the network node (first node) of the first cell is the eNB 102 of FIGS. 1 and 2B. The second cell is a different cell than the first cell. Again, for the sake of simplicity, let us assume that the first cell is the cell 204, whereas the second cell is the cell 206 of FIG. 2B. Further, according to one example which is used to describe some of the embodiments, let us assume that the first cell is the Pcell 204 and the second cell is the Scell 206. The network node (i.e. second node) of the second cell 206 may be another base station, RNC, eNB, etc. In an example, the two cells 204 and 206 are provided from the same physical location, such as from the same radio mast (as is the case in FIG. 2B) but from different network nodes. The predefined time period may be known from hard-coded information or it may be informed by the network. The time period may correspond to one or more transmission time intervals (TTIs), for example. There are various options for the first node 102 to determine is there any unused transmission (i.e. output) power in the second cell 206 or in any of a plurality of second cells. However, before going deeper to those embodiments, let us take another look at FIG. 4.

Upon detecting that there is at least some of the output power unused in the second cell 206, the first node 102 may in step 402 determine the amount of the unused output power in the second cell 206. Finally, in step 404 the first node 102 may cause an application of at least part of the unused output power in boosting a predetermined transmission in the first cell 204. Thus, the first node 102 may advantageously dynamically "borrow" certain amount of unused power from the second cell(s) 206 and boost the power in the first cell 204. An example advantages may include providing increased power/capacity for the predetermined transmission in the first cell 204. Further, the embodiments may provide increased power/SINR to achieve the BLER target with respect to the predetermined transmission.

Figure 5:
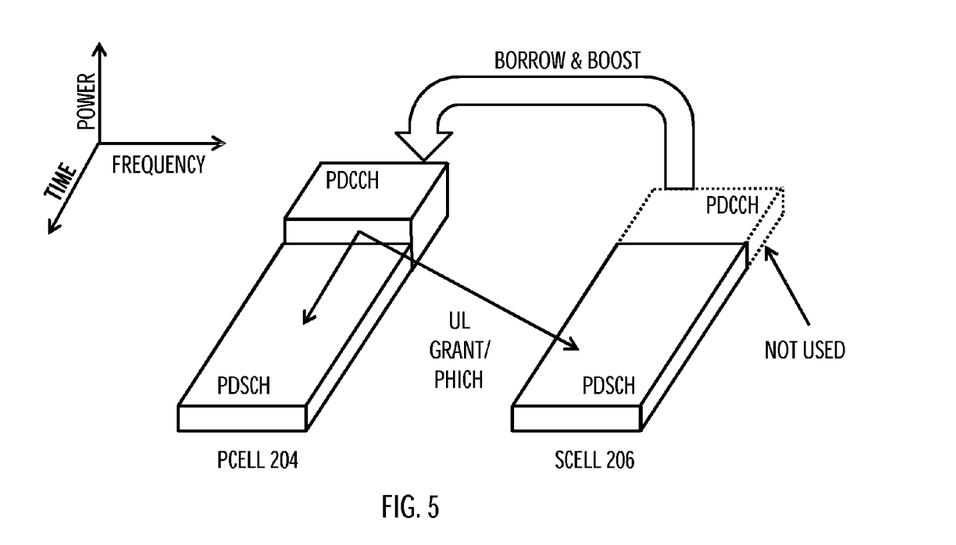
FIGS. 5, 6A, 6B, and 6C present different embodiments regarding the power boosting.

An example embodiment is shown in FIG. 5. The proposal may be applied, for example, to the cross CC scheduled CA control channel, such as to the PDCCH. As shown in FIG. 5, the Pcell 204 notices that the PDCCH of the second cell 206 is not transmitted or all of the power reserved for the PDCCH of the Second cell 206 is not used (as shown with the dotted PDCCH block of Second cell 206). Consequently, the first cell 204 may increase (i.e. boost) the transmission power applied for its PDCCH transmission by the amount not used in the Second cell 206. This is shown with the large curved arrow in FIG. 5. As shown, the horizontal axis represents frequency, the vertical axis represents applied output power, and the diagonal axis represents time. The boosted PDCCH of the Pcell 204 may then more efficiently provide the control signaling, such as UL grants and PHICHs, related to the second cell 206 or the first cell. It should be noted that the term "borrow" is simply used to represent that the dynamic increase of the transmission power by the first cell 204 may be dependent on the detection of unused power in the second cell 206.

Figure 6A:
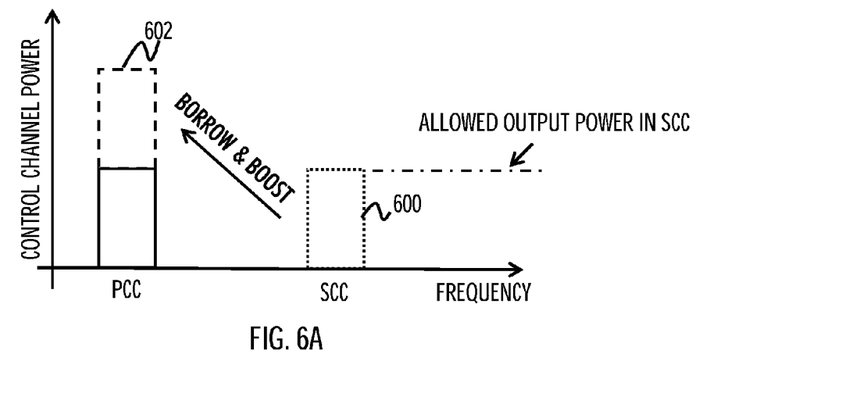

In an embodiment, as shown in FIG. 6A, the first node 102 may detect that there will not be any transmission on the specific channel in the second cell 206 during the predefined time period. Let us assume that the specific channel, for which the output power in the second cell 206 is reserved, is the PDCCH of the second cell 206. As such, the dotted block 600 represents that the PDCCH is not transmitted at all in the second cell 206.

In an embodiment, the first node 102 may have knowledge of, or determine, the unused power in the PDCCH region of the second cell 206 (i.e. the cross-CC scheduled cell) in advance, e.g. before the PDCCH scheduling and power control (PC) takes place in the two cells 204 and 206. This may be possible because there may not be any PDCCH allocations in the UE specific search space (UESS) for the second cell 206 in case the second cell 206 is used as a virtual extension carrier (not accessible to legacy UEs/non-CA capable UEs). As known by a skilled person, the search space may be seen as a region of control and a user terminal may try to find control channel transmissions (by blind decoding) in the search space. The positions in the search spaces that the user terminal may try are control channel candidates consisting of one or multiple CCEs. The UESS may contain only UE specific control channel transmissions whereas a common SS (CSS) may contain broadcast control channel transmissions.

Thereafter, as there is no PDCCH transmission allocated in the UESS for the second cell 206, the first node 102 may determine that there will be some unused output power in the second cell 206 which may be "borrowed" to the first cell 204. The node 102 may also determine a committed or an allowed (average) output power level of the second cell 206, as shown with the dash-dotted line in FIG. 6A. Such information may be determined on the basis of information received from the network, or based on some other information (SINR, quality indicator, etc.), for example. Based on such information, it may be derived how much unused output power 600 there is left in the other (i.e. second) cell 206. In other words, the first node 102 may determine the amount of the unused output power 600 in the second cell 206 on the basis of the detection and the allowed output power level of the second cell 206. Then, the first node 102 may "borrow" the unused power 600 from the second cell 206, as shown with the arrow, and boost the transmission power of the PDCCH in the first cell 204, as shown with the dashed block 602. This embodiment may allow the first node to efficiently boost the output power of the predetermined transmission as the second cell 206 is not outputting any PDCCH.

Figure 6B:
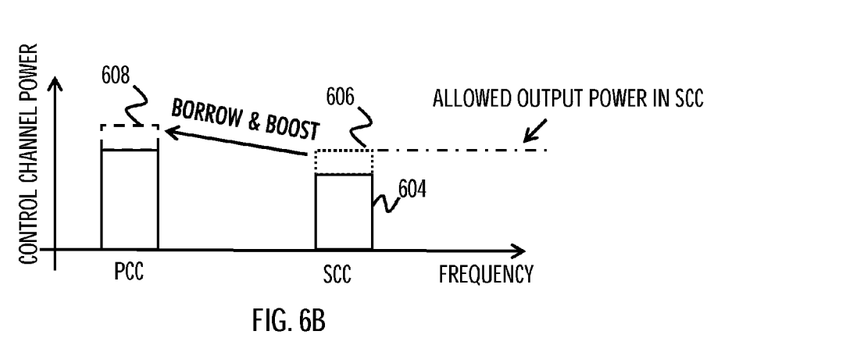

FIG. 6B shows another embodiment of the invention. In FIG. 6B it may be seen with the solid block 604 that the second cell (i.e. second component carrier) 206 does signal something by using the PDCCH. This may be known, for example, from the allocations in the UE-specific search space (UESS) and/or in the common search space (CSS) for the cross CC scheduled cell 206. As a consequence, the first node 102 may detect that there is at least one allocation for a transmission on the specific channel, such as on the PDCCH, in the second cell 206 during the predefined time period.

However, as shown with the dotted block 606, not all of the allowed output power is applied by the second cell 206. In other words, there is some unused output power left in the second cell 206, or said differently, some control channel elements (CCEs) are not used by the cross CC scheduled cell 206. I.e. the detection of the unused output power may be based on a detection that at least one CCE is not (or will not be) used by the second cell 206 in the predefined time period. For example, it may be that there is no UE specific PDCCH transmission in the cross CC scheduled cell 206, but there may be some broadcast PDCCH transmission, for example. Further, it should be noted that it is not excluded that a certain cell is a cross CC scheduled cell for some UEs while it may still transmit the PDCCH without cross CC scheduling for some other UEs.

Thereafter, the first node 102 may determine the amount of the unused output power 606 in the second cell 206 on the basis of the detection and the determined allowed output power level of the second cell 206 (represented with the dash-dotted line in FIG. 6B). Referring to FIG. 6B, the amount of unused output power may be the difference between the allowed output power level (dash-dotted line) and the used power 604, i.e. the block 606. The unused power 606 may be used for boosting the predetermined transmission in the first cell 204, as shown with the arrow and the dashed block 608. Such an embodiment may advantageously allow the network node 102 to efficiently exploit any of the remaining unused power 606 in the transmission of the first cell 204.

As shown in FIGS. 6A and 6B, the first node 102 may advantageously boost the predetermined transmission in the first cell 204 by an amount corresponding to the determined unused output power 600/606. This may be an efficient method when there are no or little restrictions regarding the allowable output power in the first cell 204. However, in an embodiment, the amount of the unused output power applied for the boosting the predetermined transmission in the first cell 204 is further limited by taking into account an allowed output power level of the first cell 204 and/or an allowed total output power of the first 204 and the second cell 206, represented with a dash-dotted line 610 in FIG. 6C.

Figure 6C:
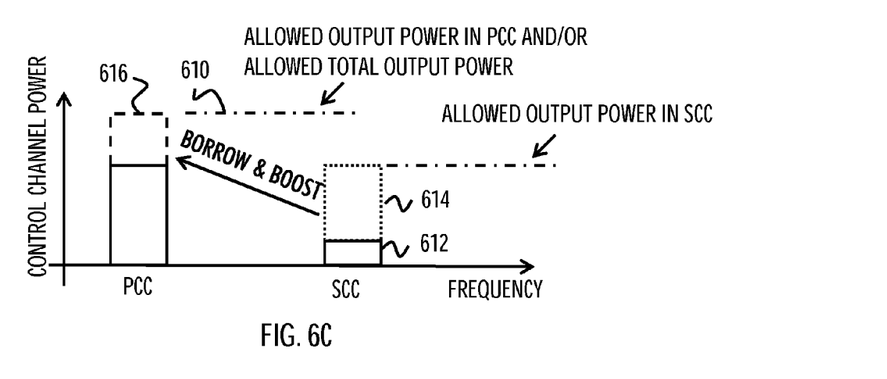

As shown in FIG. 6C, the second cell 206 applies a certain amount 612 of the power reserved for the PDCCH, i.e. there are at least some CCE allocations for the second cell 206 in the search spaces. It is to be noted that the power reserved for the PDCCH corresponds to the sum of blocks 612 and 614. As the second cell 206 does not apply all the power (612+614) but leaves the certain amount (i.e. block 614) of the applicable power unused, the first cell 204 could, in theory, apply all of the power represented with the block 614 in its own transmissions. However, there may be limitations on the application of the power by the first cell 204. These limitations may comprise, for example, the allowed output power level of the first cell 204, the allowed output power level of the second cell 206 and/or an allowed total output power of the first 204 and the second cell 206, represented with the dash-dotted line 610. As a consequence, either one or both of the limitations may restrict the amount of the power used to boost the predetermined transmission. In the example embodiment of FIG. 6C, it may be noted that the power applied for boosting, as represented with a dashed block 616, is smaller than the available amount of unused power 614. This is because the limit 610 defines the maximum amount of power usable for the predetermined transmission. In this manner, the first node 102 may advantageously apply as much power for the boosting as possible without interfering with other cells or without exceeding the committed average power limits.

Let us consider another practical example in which the number of cells is two, an allowed total transmission/output power (average, for the cell combination) is 60 W and a committed/allowed average transmission/output power for each of the cells equals to 40 W. In the prior art case the total output power may need to be divided semi-statically (e.g. with radio resource control, RRC, signaling) between the cells such that, e.g., the cell #1 uses 30 Watts and the cell #2 uses 30 Watts. According to the above examples with reference to FIG. 6C, it is clear that the power of one of the cells may be dynamically boosted up to 40 Watts in case the corresponding power in the other cell's TTI and/or control symbol is unused.

As is clear from the above examples, in some example embodiments, the unused output power 600/606/614 is originally reserved for a transmission of the control channel on the SCC in a cross CC scheduled cell. Similarly, in some embodiments, the first node 102 boosts (as shown with reference numerals 602, 608 and 616) the output power of the control channel on the PCC in the cross CC scheduled CA. In this manner, the predetermined transmission in the first cell 204 comprises the transmission of the PDCCH on PCC 200.

As known by a skilled person, according to the LTE/LTE-A, the transmission in the downlink applies an orthogonal frequency-division multiplexing (OFDM). In an embodiment, the per-OFDM symbol power basket in the cross CC scheduling cell 204 is increased for the PDCCH OFDM symbols by the known unused power 600/606/614. In an embodiment, the number of the PDCCH OFDM symbols in the cross CC scheduled cell 206 is semi-statically configured and, thus, known in advance. This may be advantageous so that the unused power of each PDCCH OFDM symbol may increase the per-OFDM symbol power basket in the cross-CC scheduling cell 204. It should be noted that the solution is applicable even though the number of PDCCH OFDM symbols might change dynamically in the first cell 204. This is because the unused power may be dynamically used to boost the current PDCCH transmission regardless of how many PDCCH OFDM symbols are applied at a given time. However, as said, in an embodiment, the committed average power per cell may not be exceeded.

In an embodiment, the first node 102 may boost the output power of downlink control information, DCI, as the predetermined transmission in the first cell 204 (i.e. the transmission of the DCI is the predetermined transmission in the first cell 204). In this manner, the power of DCI format(s) with the carrier indicator field (CIF) and/or DCI format(s) without the CIF may be advantageously boosted with the additional power. It should be noted that providing the CIF to the second cell 206 with an increased reliability may be important so that the UE acquires knowledge of the component carrier to be used.

Additionally or alternatively, in an embodiment, the first node 102 may boost the output power of control channel elements (CCEs). In other words, the power of CCEs in the UESS and/or in the CSS may be boosted with the additional power. The CCEs may then be used or not used for the control channel transmission, such as for the PDCCH. For example, in the UESS the boosted transmission may comprise UE-specific PDCCH transmission. On the other hand, in the CSS, the boosted CCEs may be used the broadcasting of, for example, the system information, paging, random access, etc.

Although the embodiments are mainly written from the point of view of increasing the control channel power of the Pcell 204 in the cross CC scheduled CA scenario, the embodiments may be applicable to other use cases involving cross-cell functionalities. These may include, for example, boosting control channel of a certain cell without cross CC scheduling or even without CA. This may be possible in case centralized PDCCH scheduling and power control is used for the considered cells.

In addition or alternatively, the data channel (PDSCH) of a certain cell may be boosted with or without cross CC scheduling and/or CA in case centralized PDSCH scheduling and power control is used for the considered cells. It is to be noted that in the case of the centralized scheduling, one single scheduler manages resources of more than one cell. On the other hand, in case of distributed scheduling there may be a separate scheduler per cell for managing radio resources of the corresponding cell.

It may be noted that the dynamic power "borrowing" and boosting between the data channels of two cells may be employed also for the distributed per cell PDSCH scheduling and power control when semi-static power borrowing/setting between the data channels of two or more cells is implemented. Without semi-static manners, the dynamic power "borrowing" and boosting may be cumbersome because the PDSCH scheduling and power control of two cells may take place at (approximately) the same time with distributed per cell scheduling architecture. Therefore, the unused power in one of the cells is not known in advance in the other cell (e.g. before PDSCH scheduling/power control). Moreover, in case of a higher order modulation (16QAM, 64QAM), the offset between the reference signal and the data channel power may be specified and may not be changed on a TTI basis.

The embodiments are applicable especially when the considered cells are in the same band (i.e. intra-band CA). However, it should be also noted that the embodiments may also be applicable to the inter-band CA case depending on the used power amplifier architecture. Further, although the embodiments have been described with examples covering two cells, the embodiments are similarly applicable to scenarios with a higher number of cells. For example, the first node 102 of the first cell 204 may detect and determine the amount of the unused power in a plurality of second cells 206 and apply at least part of the unused power for boosting. Also here the first node 102 may take care that the allowed/committed total and per-cell power levels are not exceeded.

Figure 7:
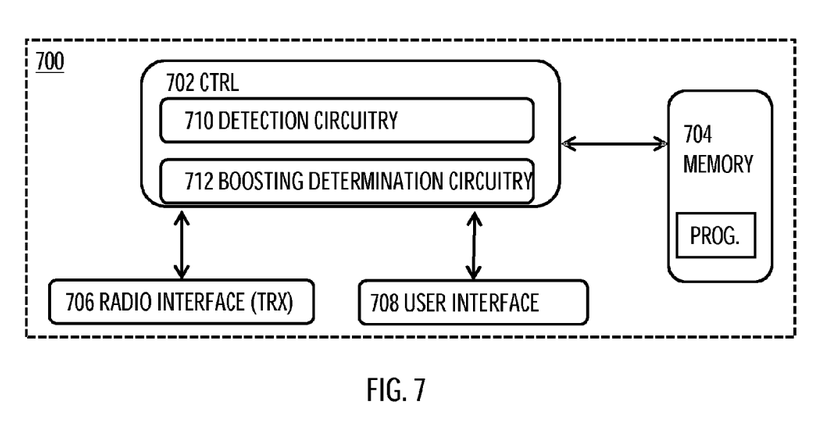
FIG. 7 depicts an apparatus according to an embodiment.

An embodiment, as shown in FIG. 7, provides an apparatus 700 comprising a control circuitry (CTRL) 702, such as at least one processor, and at least one memory 704 including a computer program code (PROG), wherein the at least one memory 704 and the computer program code (PROG), are configured, with the at least one processor 702, to cause the apparatus 700 to carry out any one of the above-described pro-cesses. It should be noted that FIG. 7 shows only the elements and functional entities required for understanding a processing system of the apparatus 700. Other components have been omitted for reasons of simplicity. It is apparent to a person skilled in the art that the apparatus may also comprise other functions and structures.

In an embodiment, the apparatus 700 may be or be comprised in a base station (also called a base transceiver station, a Node B, a radio network controller, or an evolved Node B, for example). In an embodiment the apparatus 700 is or is comprised in the eNB 102.

As said, the apparatus 700 may comprise a control circuitry 702, e.g. a chip, a processor, a micro controller, or a combination of such circuitries causing the apparatus to perform any of the embodiments of the invention. The control circuitry 702 may be implemented with a separate digital signal processor provided with suitable software embedded on a computer readable medium, or with a separate logic circuit, such as an application specific integrated circuit (ASIC). The control circuitry 702 may comprise an interface, such as computer port, for providing communication capabilities. The memory 704 may store software (PROG) executable by the at least one control circuitry 702.

The control circuitry 702 may comprise a detection circuitry 710 for detecting and determining the amount of the unused transmission power in a second cell/in second cells, according to any of the embodiments. The control circuitry 702 may comprise a boosting determination circuitry 712 for boosting the transmission of the predetermined channel. The circuitry 712 may also determine how much boosting may be applied. For example, it may take the limitations regarding the allowed output power levels into account.

The apparatus 700 may further comprise radio interface components (TRX) 706 providing the apparatus with radio communication capabilities with the radio access network. The radio interface components 706 may comprise standard well-known components such as amplifier, filter, frequency-converter, (de)modulator, and encoder/decoder circuitries and one or more antennas. The TRX 706 may, for example, be caused to perform the predetermined transmission with the boosted output power.

The apparatus 700 may also comprise a user interface 708 comprising, for example, at least one keypad, a microphone, a touch display, a display, a speaker, etc. The user interface 708 may be used to control the apparatus 700 by the user.

As said, the apparatus 700 may comprise the memory 704 connected to the control circuitry 702. The memory 704 may be implemented using any suitable data storage technology, such as semiconductor based memory devices, flash memory, magnetic memory devices and systems, optical memory devices and systems, fixed memory and removable memory. The memory 704 may be for storing data related to the detected unused power in each second cell and possible limitation on the allowed transmission powers, for example.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:
1. A method, comprising:
  detecting, by a network node of a first cell, whether or not there is any output power unused in a second cell during a predefined time period,
    wherein the detecting is based on at least one of the following:

the second cell being configured to use cross component carrier scheduling, and
signaling from the second cell, and
wherein the unused output power is originally reserved for a transmission on a specific channel in the second cell;
upon detecting that there is at least some of the output power unused, determining the amount of the unused output power in the second cell; and
applying at least part of the unused output power to boost the output power of downlink control information, DCI, as a predetermined transmission in the first cell.

2. The method of claim 1, further comprising:
determining an allowed output power level of the second cell;
detecting that there will not be any transmission on the specific channel in the second cell during the predefined time period; and
determining the amount of the unused output power in the second cell on the basis of the detection and the allowed output power level of the second cell.

3. The method of claim 1, further comprising:
determining an allowed output power level of the second cell;
detecting that there is at least one allocation for a transmission on the specific channel in the second cell during the predefined time period; and
determining the amount of the unused output power in the second cell on the basis of the detection and the allowed output power level of the second cell.

4. The method of claim 1, further comprising:
boosting the predetermined transmission in the first cell by an amount corresponding to the determined unused output power.

5. The method of claim 1, wherein the amount of the unused output power applied for the boosting the predetermined transmission in the first cell is further limited by taking into account an allowed output power level of the first cell, the allowed output power level of the second cell, and/or an allowed total output power level of the first and the second cell.

6. The method of claim 1, wherein the unused output power is originally reserved for a transmission of a control channel on a secondary component carrier in a cross component carrier scheduled carrier aggregation.

7. The method of claim 1, further comprising:
boosting the output power of a control channel on a primary component carrier in the cross component carrier scheduled carrier aggregation as the predetermined transmission in the first cell.

8. The method of claim 1, further comprising:
boosting the output power of control channel elements as the predetermined transmission in the first cell.

9. The method of claim 1, wherein a control channel and/or data channel scheduling and power control are distributed among the plurality of cells.

10. The method of claim 1, wherein a control channel and/or data channel scheduling and power control are controlled in a centralized manner by one cell among the plurality of cells.

11. An apparatus, comprising:
at least one processor and at least one memory including a computer program code, wherein the at least one memory and the computer program code are configured, with the at least one processor, to cause the apparatus at least to:
detect whether or not there is any output power unused in a second cell during a predefined time period,
wherein the detection is based on at least one of the following:
the second cell being configured to use cross component carrier scheduling, and
signaling from the second cell to the first cell, and
wherein the unused output power is originally reserved tier a transmission on a specific channel in the second cell;
upon detecting that there is at least some of the output power unused, determine the amount of the unused output power in the second cell; and
apply at least part of the unused output power to boost the output power of downlink control information, DCI, as a predetermined transmission in a first cell.

12. The apparatus of claim 11, wherein the at least one memory and the computer program code are configured, with the at least one processor, to cause the apparatus further to:
determine an allowed output power level of the second cell;
detect that there will not be any transmission on the specific channel in the second cell during the predefined time period; and
determine the amount of the unused output power in the second cell on the basis of the detection and the allowed output power level of the second cell.

13. The apparatus of claim 11, wherein the at least one memory and the computer program code are configured, with the at least one processor, to cause the apparatus further to:
determine an allowed output power level of the second cell;
detect that there is at least one allocation for a transmission on the specific channel in the second cell during the predefined time period; and
determine the amount of the unused output power in the second cell on the basis of the detection and the allowed output power level of the second cell.

14. The apparatus of claim 11, wherein the at least one memory and the computer program code are configured, with the at least one processor, to cause the apparatus further to:
boost the predetermined transmission in the first cell by an amount corresponding to the determined unused output power.

15. The apparatus of claim 11, wherein the amount of the unused output power applied for the boosting the predetermined transmission in the first cell is further limited by taking into account an allowed output power level of the first cell, the allowed output power level of the second cell, and/or an allowed total output power level of the first and the second cell.

16. The apparatus of claim 11, wherein the unused output power is originally reserved for a transmission of a control channel on a secondary component carrier in a cross component carrier scheduled carrier aggregation.

17. The apparatus of claim 11, wherein the at least one memory and the computer program code are configured, with the at least one processor, to cause the apparatus further to:
boost the output power of a control channel on a primary component carrier in the cross component carrier scheduled carrier aggregation as the predetermined transmission in the first cell.

18. The apparatus of claim 11, wherein the at least one memory and the computer program code are configured, with the at least one processor, to cause the apparatus further to:
  boost the output power of control channel elements as the predetermined transmission in the first cell.

19. The apparatus of claim 11, wherein a control channel and/or a data channel scheduling and power control are distributed among the plurality of cells.

20. The apparatus of claim 11, Wherein a control channel and/or a data channel scheduling and power control are controlled in a centralized manner by one cell among the plurality of cells.

21. An apparatus, comprising process' cans configured to cause the apparatus to perform the method according to claim 1.

22. A computer program product embodied on a non-transitory distribution medium readable by a computer and comprising program instructions which, when loaded into an apparatus, execute the method according to claim 1.

* * * * *